Oct. 2, 1934.    D. E. GRAY    1,975,269

GLASS PIPE

Filed May 24, 1933

INVENTOR.
DAVID E. GRAY
BY
ATTORNEYS.

Patented Oct. 2, 1934

1,975,269

UNITED STATES PATENT OFFICE 1,975,269

GLASS PIPE

David E. Gray, Corning, N. Y., assignor to Corning Glass Works, Corning, N. Y., a corporation of New York Application May 24, 1933, Serial No. 672,723

4 Claims. (Cl. 137—75)

This invention relates to glass pipe and more particularly to the protecting of glass pipe from injury due to mechanical shocks and the like.

Glass has been found to be an ideal material for use in contact with fluids as due to its non-corrosive character and smoothness, there is no tendency to retard the flow of fluids through it when it is used as pipe. Due to its fragile nature, however, glass pipe has not found extensive use except in places where it is exposed to view and its fragile nature can be appreciated. As a result, metal pipe is still used to a very large extent in fluid distribution systems, such as the gas and water distribution systems in cities and like communities with the attendant necessity of making almost constant repairs to the system where, due to corrosion, the effective pipe opening has been considerably reduced or completely closed.

The object of the present invention is to protect a glass pipe from injury due to mechanical shock, excessive external loading or the like and adapt it for service where it has heretofore been impracticable.

The above and other objects may be attained by employing my invention which embodies among its features supporting a glass pipe on cushions in spaced relation to an external metallic sheath and employing the end fittings not only as supports for the pipe but also as couplings by which abutting ends of pipe sections may be held in alignment.

Figure 1:
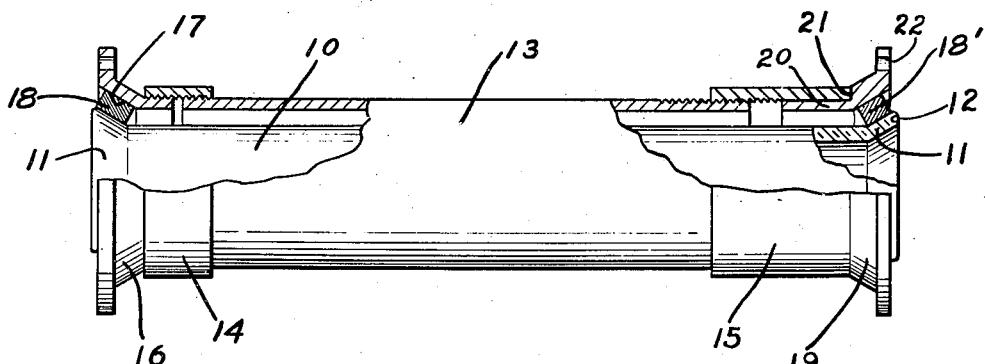
Fig. 1 is a side view partly in section of a pipe section constructed in accordance with my invention.

Referring to the drawing in detail, a glass tube 10 is provided at opposite ends with outwardly flared thickened portions 11 which taper as shown to form an inclined shoulder against which abuts a cushioning element to be more fully hereinafter described. As shown, the end of the thickened portion 11 is preferably provided with an annular groove 12 for the reception of a suitable packing gasket (not shown).

As illustrated a metal tube 13 of greater internal diameter than the external diameter of the flared portions 11 is fitted over the tube 10 and is provided at opposite ends with screw threads by means of which internally threaded coupling rings 14 and 15 are attached to it. Connected to the tube 13 by the coupling ring 14 is a flanged fitting 16 which is provided adjacent its free end with a flared portion, the internal wall 17 of which is tapered to lie substantially parallel with the outer side of the flared portion 11 of the tube 10. Surrounding the flared portion 11 and filling the space between it and the wall 17 is a ring-shaped cushion 18 which when the device is assembled serves as a spacer to hold the tubes 10 and 13 in spaced parallel relation.

Figure 2:
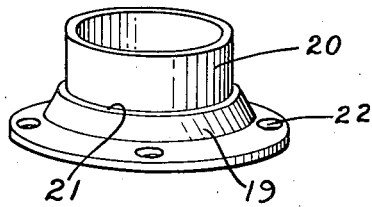
Fig. 2 is a perspective view of one of the end fittings.
Figure 3:
Fig. 3 is a perspective view of one of the cushions.

Encircling the flared portion 11 at the opposite end of the tube 10 is a similar cushion 18' and surrounding the latter is a flanged fitting 19 which like the fitting 16 is provided with an inwardly tapering portion for engagement with the cushion 18'. As illustrated in Figs. 1 and 2, the fitting 19 is provided with a cylindrical extension 20 over which the end of the coupling ring 15 extends. Formed at the junction between the cylindrical extension 20 and the tapered portion of the fitting 19 is a shoulder 21 against which the end of the coupling ring 15 abuts. As shown, the flanges of the fittings 16 and 19 may be provided with openings 22 for the reception of bolts by which abutting ends of the pipes may be joined and held in proper position.

By rotating the coupling ring 15, the end opposite that attached to the metal tube 13 may be forced against the shoulder 21 to urge the fittings 16 and 19 apart and tightly clamp the cushions 18 and 18' between the outer sides of the flared portions 11 of the tube 10 and the inner tapered portion of the fittings 16 and 19. Thus it will be seen that the tubes 10 and 13 will be held in spaced parallel relation so that mechanical shocks received by the tube 13 will not be transmitted to the tube 10.

While in the foregoing, there has been shown and described the preferred embodiment of my invention, it is to be understood that minor changes in the details of construction, combination and arrangement of parts may be resorted to without departing from the spirit and scope of the invention as claimed.

What I claim is:

1. A pipe section comprising a glass tube having upset outwardly flared ends, a metal tube surrounding the glass tube, said metal tube being of greater internal diameter than the external diameter of the glass tube, fittings at opposite ends of the metal tube, said fittings having tapered openings, the walls of which are concentric with the walls of the flared ends of the glass tube, cushions between the walls of the fittings and flared ends of the glass tubes and means to exert longitudinal pressure on the fittings and urge them into contact with the cushions.

2. A pipe section comprising a glass tube having outwardly flared ends, a metal tube surrounding the glass tube said metal tube being of greater internal diameter than the external diameter of the flared ends of the glass tube, cushions encircling the flared ends of the glass tube, fittings at opposite ends of the metal tubes for engaging the cushions and holding the tubes in spaced concentric relation and means on the metal tube for exerting endwise pressure on the fittings to compress the cushions between the fittings and the flared ends of the glass tube.

3. A pipe section comprising a glass tube having outwardly flared ends, a metal tube surrounding the glass tube, said metal tube being of greater internal diameter than the external diameter of the flared ends of the glass tube, cushions encircling the flared ends of the glass tube, a fitting attached to one end of the metal tube and engaging one of the cushions, an adjustable fitting at the opposite end of the metal tube and engaging the other cushion and means carried by the metal tube for exerting pressure on the cushions to retain the glass and metal tubes in spaced concentric relation.

4. A pipe section comprising a glass tube having outwardly flared ends, a metal tube surrounding the glass tube, said metal tube being of greater internal diameter than the external diameter of the upset ends of the glass tube, cushions encircling the flared ends of the glass tube, a fitting attached to one end of the metal tube and engaging one of the cushions, an adjustable fitting at the opposite end of the metal tube and engaging the other cushion, a tubular extension on the last named fitting extending toward the metal tube in alignment therewith, a shoulder intermediate the ends of the fitting, and a coupling sleeve adjustable on the metal tube for receiving the tubular extension on the fitting and engaging the shoulder.

DAVID E. GRAY.